M. T. KEHOO.
Stock Car.
No. 60,906.
Patented Jan. 1, 1867.
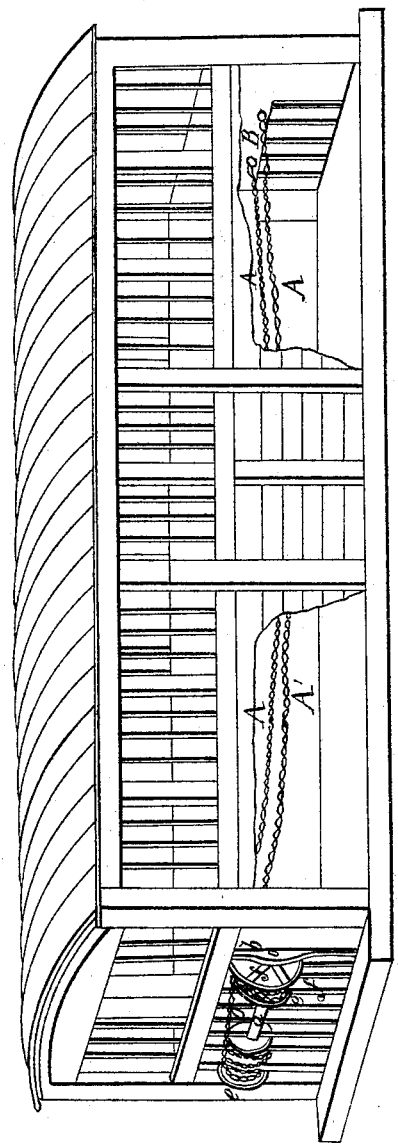
Witnesses:
Inventor:

United States Patent Office.

MOSES T. KEHOO, OF AMSTERDAM, NEW YORK.

Letters Patent No. 60,906, dated January 1, 1867.

IMPROVED CATTLE CAR.

The Schedule referred to in these Letters Patent and making part of the same.

Be it known that I, MOSES T. KEHOO, of Amsterdam, Montgomery county, State of New York, have invented an apparatus to be attached to Railroad Cattle Cars to further the safe and humane conveyance of animals; and I declare the following specification, with the drawing forming part thereof, to be a full and complete description of my invention.

The drawing represents a cattle car box in perspective, with a portion of the near side removed to give a view of my apparatus.

It is a well-known fact that during the passages of cattle upon railroads, especially in warm weather, many become too fatigued to stand up, and fall down on their sides. When the cars are crowded with cattle, which is almost universally the case, the animal or animals that lie down are sure to be sorely trampled on, and are frequently killed in the cars or reduced to such a condition as to require the killing of them at the end of the journey. To save this loss to owners and to secure animals from such cruel treatment is the object of my contrivance.

It consists simply in stretching lengthwise along the cars two or more chains, A A, secured at one end to a stout bar, B, and at the other end passing around a horizontal windlass, C, formed in the usual manner of such machinery, as represented, being a shaft, $a$, pivoted through brackets $b$ at each end, and secured to the frame of the cars, the shaft having drums $e$ at each end, one to each chain, and being turned by a hand-wheel, $f$, and held by a ratchet and pawl, (not seen in the drawing.) Any other convenient method of stretching and securing the chains may be used. If necessary, the chain can be wrapped about with matting or cloths to alleviate its roughness, or ropes may be substituted for chains.

The operation of the apparatus is obvious. The chain, being slackened so as to lie upon the floor of the car, the cattle are driven in and ranged across it; then, by the windlass, the chains are drawn up so as not to interfere with the comfort of the animals when standing, but so as to hold any of them up in case, from weariness or weakness, they should attempt to lie down. By this aid the animal is supported from falling under the feet of the others, and enabled to recover strength to stand again, as in the case of horses provided with slings for the same purpose in a cavalry transport ship.

What I claim as my invention, and desire to secure by Letters Patent, is—

The attachment to and combination with a railroad car, of chains or ropes with a windlass for operating them, in the manner described, and for the purposes set forth in this specification.

M. T. KEHOO.

Witnesses:
RICH'D VARICK DE WITT,
J. W. RUSSELL.